(12) United States Patent
Ravichandran et al.

(10) Patent No.: US 11,386,026 B1
(45) Date of Patent: Jul. 12, 2022

(54) SHELL PCIE BRIDGE AND SHARED-LINK-INTERFACE SERVICES IN A PCIE SYSTEM

(71) Applicant: MICROSOFT TECHNOLOGY LICENSING, LLC, Redmond, WA (US)

(72) Inventors: Narayanan Ravichandran, Bellevue, WA (US); Aaron Michael Landy, Kent, WA (US); Robert Groza, Jr., Redmond, WA (US); Hari Daas Angepat, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/171,705

(22) Filed: Feb. 9, 2021

(51) Int. Cl.
*G06F 13/20* (2006.01)
*G06F 13/42* (2006.01)
*G06F 13/40* (2006.01)

(52) U.S. Cl.
CPC .......... *G06F 13/20* (2013.01); *G06F 13/4027* (2013.01); *G06F 13/4282* (2013.01); *G06F 2213/0026* (2013.01)

(58) Field of Classification Search
CPC ... G06F 13/20; G06F 13/4282; G06F 13/4027
See application file for complete search history.

(56) References Cited

U.S. PATENT DOCUMENTS 7,613,864 B2   11/2009   Toerudbakken et al.
7,734,859 B2   6/2010    Daniel et al.
(Continued)

FOREIGN PATENT DOCUMENTS

WO     2020222972 A1    11/2020

OTHER PUBLICATIONS

"Cyclone® V Avalon® Streaming (AvalonST) Interface for PCIe* Solutions User Guide", Retrieved from: https://www.intel.com/content/dam/www/programmable/us/en/pdrs/literature/ug/ug_c5_pcie_avst.pdf, Jun. 2, 2020, 228 Pages. Uploaded in three parts.
(Continued)

*Primary Examiner* — Henry Tsai
*Assistant Examiner* — Christopher A Daley
(74) *Attorney, Agent, or Firm* — Holzer Patel Drennan

(57) ABSTRACT

Methods, systems, and computer storage media for providing a Shell PCIe Bridge (SPB) and shared-link-interface services that support a shared common PCIe physical link between SPB clients in a PCIe system. In operation, shared-link-interface operations include accessing, at a Shell PCIe Bridge (SPB), an outbound transaction for a PCIe endpoint vendor IP or an inbound transaction for an SPB client. The SPB supports a shared common PCIe physical link based on a shared-link-interface comprising vendor-agnostic downstream custom interface and a vendor-specific upstream PCIe endpoint interface. The shared-link-interface operations further include processing the outbound transaction or the inbound transaction based on shared-link-interface services. In this way, processing transaction comprises executing shared-link-interface operations that provide protection enhancements associated with sharing a physical PCIe link. The shared-link-interface operations further include communicating the outbound transaction to the PCIe endpoint vendor IP or the inbound transaction to the SPB client.

20 Claims, 8 Drawing Sheets

(56) References Cited

U.S. PATENT DOCUMENTS

| | | | |
|---|---|---|---|
| 7,934,033 B2 | 4/2011 | Malwankar et al. | |
| 9,122,810 B2* | 9/2015 | Hormuth | G06F 15/17331 |
| 9,292,460 B2 | 3/2016 | Freking et al. | |
| 2012/0284437 A1 | 11/2012 | Ayzenfeld et al. | |
| 2013/0007332 A1* | 1/2013 | Teh | G06F 13/385 |
| | | | 710/313 |
| 2014/0019661 A1* | 1/2014 | Hormuth | G06F 13/00 |
| | | | 710/306 |
| 2014/0108703 A1 | 4/2014 | Cohen et al. | |
| 2017/0052916 A1* | 2/2017 | Kollu | G06F 13/4282 |
| 2019/0107965 A1 | 4/2019 | Deval et al. | |
| 2019/0215277 A1* | 7/2019 | Dhanoa | H04L 47/58 |
| 2019/0332409 A1* | 10/2019 | Fried-Gintis | G06F 9/453 |
| 2020/0192852 A1 | 6/2020 | Caruk et al. | |
| 2020/0210254 A1 | 7/2020 | Kimura et al. | |
| 2020/0301873 A1* | 9/2020 | Borikar | G06F 13/28 |

OTHER PUBLICATIONS

Ciufo, Chris A., "One to Many: PCI Express Begs to be Bridged", Retrieved from: https://www.diodes.com/design/support/technical-articles/pericoms-articles/one-to-many-pci-express-begs-to-be-bridged/, Retrieved Date: Nov. 1, 2020, 6 pages.

"International Search Report and Written Opinion Issued in PCT Application No. PCT/US22/013582", dated May 30, 2022, 9 Pages.

\* cited by examiner

US 11,386,026 B1

SHELL PCIE BRIDGE AND SHARED-LINK-INTERFACE SERVICES IN A PCIE SYSTEM

BACKGROUND

Users rely on applications and services to perform computing tasks. Distributed computing systems (e.g., cloud computing platforms) host applications and services using computing architectures that support network access to a shared pool of configurable computing and storage resources. Peripheral Component Interconnect Express (PCIe) systems provide an operating environment for implementing an interface standard—for connecting high-speed components—in a high-speed serial computer expansion bus in cloud computing platforms and computing devices, in general. For example, a computing device may include a motherboard that has a number of PCIe slots, which can be used to add graphics processing units (GPUs), (Redundant Array of Independent Disks (RAID) cards, and Wi-Fi cards. Conventionally, PCIe systems are not designed to manage changing workloads (i.e., increased workloads or mixed workloads) that are commonplace in cloud computing platforms. Compliance requirements of the PCIe specification limit the ability to redesign PCIe systems for changing workloads. As PCIe systems continue to support cloud computing platforms, improving PCIe system operations can result in more effective and efficient PCIe systems.

SUMMARY

Various aspects of the technology described herein are generally directed to systems, methods, and computer storage media, for among other things, providing a Shell PCIe Bridge (SPB) and shared-link-interface services that support a shared common PCIe physical link. The PCIe physical link is shared between SPB clients (e.g., network, storage, and compute accelerator applications) in a PCIe system. The SPB executes shared-link-interface operations to implement the shared-link-interface services (e.g., a non-blocking fabric, trusted Transaction Layer Packet (TLP) processing, a Function Level Reset (FLR) protocol, isolation, and quality of service functionality) in the PCIe system. The SPB and the shared-link-interface services support processing transactions (e.g., outbound transactions or inbound transactions) for sharing the PCIe physical link.

By way of background, sharing a PCIe physical link has conventionally not been implemented because of the challenges associated with managing the sharing of a PCIe physical link—for packets received from downstream applications intended for PCIe endpoint vendor IPs (i.e., vendor Intellectual Property endpoints)—while maintaining upstream compliance with PCIe specifications. In particular, the PCIe Specification has not developed support for both a vendor-agnostic downstream custom interface and a vendor-specific upstream PCIe endpoint vendor IP interface (both collectively referred to as a "shared-link-interface") for sharing a PCIe physical link between a fabric (e.g., FPGA fabric) and a host CPU. Sharing a PCIe physical link with the current PCIe Specification—without additional modifications—would impose severe restrictions when various classes of downstream workloads (e.g., network, storage, and compute accelerators) share the same physical link and limit interoperability between components in the PCIe system.

A technical solution—to address the limitations of conventional PCIe system operations—provides a PCIe system that includes a shared common PCIe physical link (e.g., via physical PCIe lanes to a host CPU in a cloud deployment) between applications in a Field-Programmable Gate Array (FPGA) or Application-Specific Integrated Circuit (ASIC). The shared common PCIe physical link is provided as a sharing abstraction (i.e., an "SPB shared-link-interface system" or "shared-link-interface") for various accelerator applications. An SPB shared-link-interface includes both a vendor-agnostic downstream custom interface and a vendor-specific upstream PCIe endpoint interface to facilitate sharing the common PCIe physical link. Moreover, the shared-link-interface also supports shared-link-interface services (e.g., non-blocking fabric, trusted Transaction Layer Packet (TLP), SPB Function Level Reset (FLR) protocol, isolation, and quality of service functionality) that enable protection features that prevent an untrusted or erroneous application from impacting the PCIe system functionality and performance.

In operation, shared-link-interface operations include accessing, at a Shell PCIe Bridge (SPB), an outbound transaction intended for a PCIe endpoint vendor IP or an inbound transaction intended for an SPB client. The SPB supports a shared common PCIe physical link based on a shared-link-interface comprising a vendor-agnostic downstream custom interface and a vendor-specific upstream PCIe endpoint interface. The shared-link-interface operations further include processing the outbound transaction or the inbound transaction based on one or more shared-link-interface services—processing includes executing shared-link-interface operations to provide protection enhancements associated with sharing the physical PCIe link. The shared-link-interface operations further include communicating the outbound transaction to the PCIe endpoint vendor IP or the inbound transaction to the SPB client.

In addition, shared-link-interface operations are further implemented—using the SPB—to provide shared-link-interface services (e.g., a non-blocking fabric, trusted Transaction Layer Packet (TLP), SPB Function Level Reset (FLR) protocol, isolation, and quality of service functionality) in the PCIe system. The SPB and the shared-link-interface services support processing transactions (e.g., outbound transactions or the inbound transactions) for sharing a PCIe physical link.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1A:
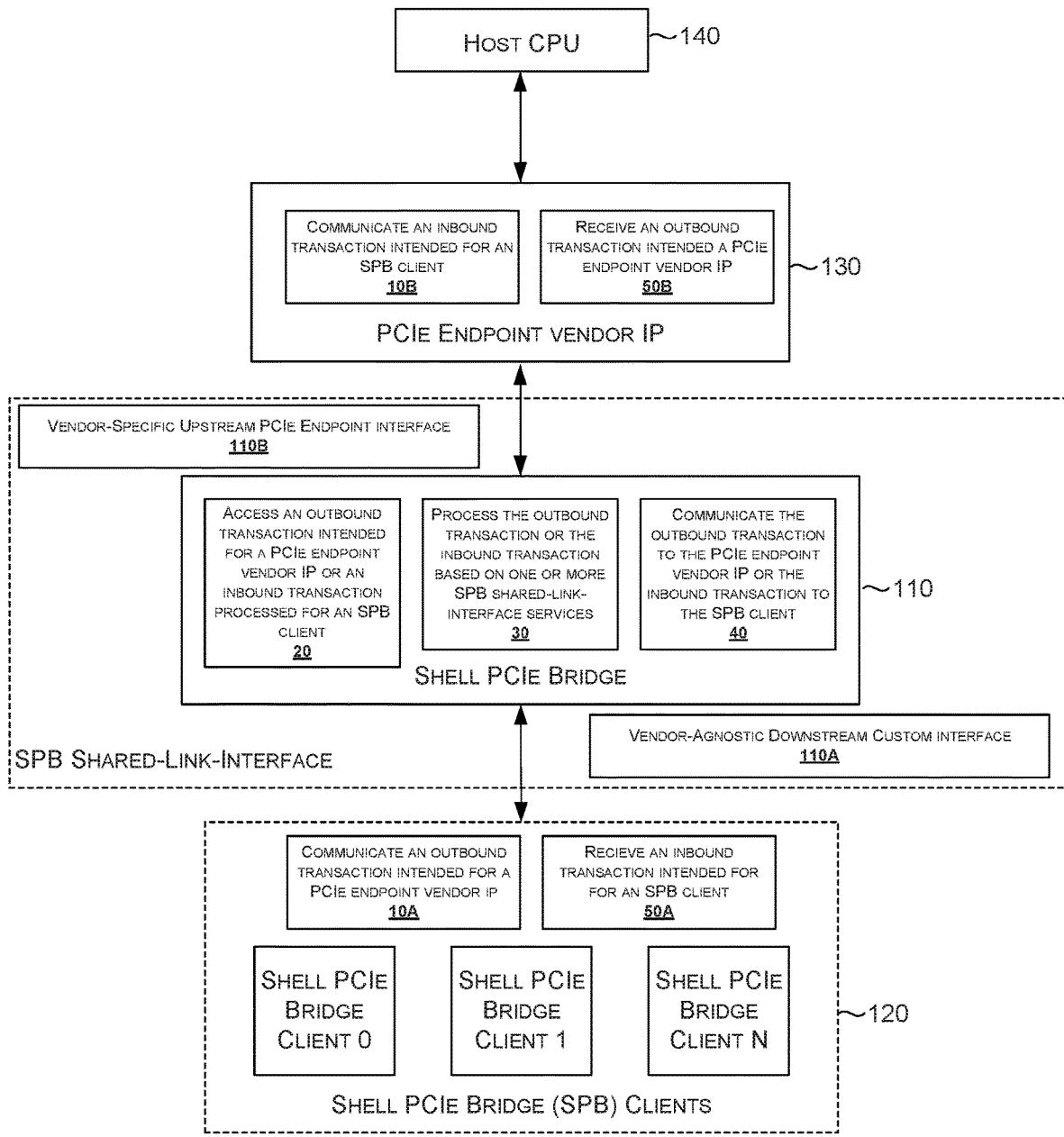
FIG. 1A is a block diagram of an exemplary PCIe system environment for providing PCIe operations based on shared-link-interface services in a PCIe system, suitable for use in implementing aspects of the technology described herein.

Overview of Technical Problems, Technical Solutions, and Technological Improvements A Peripheral Component Interconnect Express (PCIe) system refers to an operating environment that implements an interface standard for connecting high-speed components in a high-speed serial computer expansion bus operating environment. The PCIe system identifies the links between devices, creating a map of where traffic will go and managing transactions associated with each link. The identification of devices and connections is based on a PCIe specification (e.g., standard and protocol). The PCIe architecture includes a layered protocol to communicate between devices. For example, a physical layer link, a data link layer, and a transaction layer for a PCIe protocol stack. The PCIe link is built around dedicated unidirectional pairs of serial point-to-point connections referred to as a lane. A link between devices includes some number of lanes.

PCIe may be a converged protocol stack implementation on integrated circuits (e.g., application-specific integrated circuits—"ASIC" or Field-Programmable Gate Array circuits—"FPGA"). A converged protocol refers to a merged specialty or proprietary protocol with a standard protocol. ASIC and FPGA can use IP (Intellectual Property) cores as building blocks. Semiconductor intellectual property cores, IP cores, or IP blocks refer to a reusable unit of logic, cell, or integrated circuit layout design that is the intellectual property of one party. IP core can be licensed to another party or owned and used by a single party. Operationally, PCIe systems manage communications between accelerator applications (e.g., network, storage, compute accelerator applications) and especially in high-end integrated circuits. FPGAs, in particular, can be reprogrammed to desired application or functionality requirements.

Conventionally, PCIe systems are not designed to manage changing workloads (i.e., increased workloads and mixed workloads) that are commonplace in cloud computing platforms. In cloud computing platforms, there is increasing adoption of sophisticated artificial intelligence/machine learning (AI/ML) applications and the shift to cloud-based workloads there has been a significant increase in network traffic. For example, AI/ML workloads implicate network, storage compute, and sensor processing which include voice recognition and image recognition. As such, the workloads are diverse (e.g., mixed workloads with read I/Os and write I/Os) with diverse patterns. Processing of the increased network traffic and mixed loads is currently managed—with several deficiencies—using conventional PCIe bridges and a physical PCIe link connection between PCIe clients and a host CPU.

Moreover, compliance requirements of the PCIe specification limit the ability to redesign PCIe systems for changing workloads. For example, a PCIe device endpoint is configured to process data packets in a manner that complies with the PCIe specification. Conventional attempts to manage changing workloads have mostly included custom solutions that can be tedious and time-consuming to implement. As such, a comprehensive PCIe system with an alternative basis for executing PCIe system operations can improve computing operations and interfaces in PCIe systems.

Embodiments of the present invention are directed to simple and efficient methods, systems, and computer storage media for providing a Shell PCIe Bridge (SPB) and shared-link-interface services that support a shared common PCIe physical link between SPB clients (e.g., network, storage, and compute accelerator applications) in a PCIe system. The shared common PCIe physical link is provided as a sharing abstraction (i.e., an "SPB shared-link-interface" system or a "shared-link-interface") to various accelerator applications. The SPB executes shared-link-interface operations to implement the shared-link-interface services (e.g., a non-blocking fabric, trusted Transaction Layer Packet (TLP) processing, a Function Level Reset (FLR) protocol, isolation, and quality of service functionality) in the PCIe system. The SPB and the shared-link-interface services support processing transactions (e.g., outbound transactions or inbound transactions) for sharing the PCIe physical link.

By way of background, sharing a PCIe physical link has conventionally not been implemented because of the challenges associated with managing the sharing of a PCIe physical link—for packets received from downstream applications intended for upstream endpoint vendor IPs—while maintaining upstream compliance with PCIe specifications In particular, the PCIe Specification has not developed support for both a vendor-agnostic downstream custom interface and a vendor-specific upstream PCIe endpoint vendor IP interface (both collectively referred to as a "shared-link-interface") for sharing a PCIe physical link between a fabric (e.g., FPGA fabric) and a host CPU. Sharing a PCIe physical link with the current PCIe specification defined standards—without additional modifications—would impose severe restrictions when various workloads (e.g., network, storage, and compute accelerators) share the same physical link and would limit interoperability between components in the PCIe system.

A technical solution—to address the limitations of conventional PCIe system operations—provides a PCIe system that includes a shared common PCIe physical link (e.g., via physical PCIe lanes to a host CPU in a cloud deployment) between applications in a Field-Programmable Gate Array (FPGA) or Application-Specific Integrated Circuit (ASIC). The shared common PCIe physical link is provided as a sharing abstraction (i.e., an "SPB shared-link-interface system" or "shared-link-interface") for various accelerator applications. An SPB shared-link-interface includes both a vendor-agnostic downstream custom interface and a vendor-specific upstream PCIe endpoint interface to facilitate sharing the common PCIe physical link. Moreover, the shared-link-interface also supports shared-link-interface services (e.g., non-blocking fabric, trusted Transaction Layer Packet (TLP), SPB Function Level Reset (FLR) protocol, isolation, and quality of service functionality) that enable protection features that prevent an untrusted or erroneous application from impacting the PCIe system functionality and performance.

The PCIe system includes a Shell PCIe Bridge that supports a downstream custom interface (e.g., a vendor-agnostic downstream custom interface) and an upstream specification-compliant interface (e.g., a vendor-specific upstream PCIe endpoint interface). The downstream custom interface operates in an FPGA fabric for FPGA-supported applications. The abstraction computing layer allows different types of FPGA-supported applications to share a common PCIe physical link. A PCIe physical link is a point-to-point connection between two PCIe ports or endpoints, allowing them to send and receive PCIe requests (e.g., configuration, I/O or memory read/write). The PCIe physical link can be operably connected to a host CPU for cloud computing system deployments.

The downstream custom interface is a proprietary client interface in that it is agnostic to a particular FPGA. The downstream custom interface is supported using shared-link-interface operations that facilitate application portability across different devices (e.g., FPGA devices) and device families. The SPB exposes the downstream custom interface to downstream applications as a mechanism to support the downstream applications, while remaining upstream compliant via the upstream specification-compliant interface. The PCIe system and downstream custom interface support all Transaction Layer Packet (TLP) features—as discussed in more detailed.

By way of context, there exists upstream interface changes across PCIe generations and link speed changes in FPGA device families. With embodiments described herein, the downstream custom interface—exposed to applications—remains the same across any changes to the upstream interfaces, thus facilitating engineering reuse and ease of access. Moreover, the downstream customer interface further allows the SPB client to general PCIe transactions—without imposing limitations on what is permissible. The SPB-client interface abstraction does not limit the downstream capabilities. Additionally, protection enhancements via the shared-link interface services includes minimizing the implementation complexity of downstream applications (i.e., SPB clients) and improving a gate-count efficiency on-chip. The protection enhancements are possible based on implementing the PCIe protocol features on one common block—within the SPB—and exposing an abstracted interface to the SPB clients without compromising PCIe TLP capabilities.

The SPB can support the downstream custom interface using physical channels, virtual channels, and a data path interface having a credit-based data packet flow controller. The downstream custom interface facilitates and supports placement and routing of different accelerators on-chip. The downstream custom interface also supports an outbound path for transactions (e.g., to PCIe endpoint vendor IPs) and an inbound path for transactions (e.g., to SPB clients). The downstream custom interface further supports non-blocking data flow for the outbound path and the inbound path. In particular, non-blocking data flow can be implemented for different cycle type transactions (e.g., memory reads, memory writes, and completion transactions). Non-blocking data flow can be provided specifically based on implementing independent virtual channels (e.g., outbound path scenario) and physical channels (e.g., inbound path scenario), as discussed in more detail below.

By way of example, reads targeting host memory, which contain header fields, are mapped to a physical channel 1 (i.e., PC1). Writes targeting host memory and completions in response to reads coming back from the host, which contain header and data fields, are mapped to physical channel 2 (i.e., PC2). A cycle type on PC2 uses an independent virtual channel (VC) that enables non-blocking data flow on an outbound path. Incoming cycle types from the host CPU to FPGA fabric (e.g., memory reads, memory writes and completions) are mapped to physical channel 3 (i.e., PC3). PC3 is virtualized to support two virtual channels that enables non-blocking flow on the inbound path.

The SPB is responsible for performing shared-link-interface service TLP operations (referred to herein as TLP operations) using a TLP processing engine. PCIe supports packetized transactions (i.e. transaction layer packets—TLP) that include an address and the data for transactions associated with a CPU and a device. Packets are received in a transaction layer that supports different types of packets (e.g., memory read, memory write, I/O read, I/O write, message, completion etc.). The transaction layer accepts packets and issues packets. The packets are communicated in a specific format called transaction layer packets (TLPs). TLPs are handled (i.e., TLP handling) when a packet is communicated between the physical layer and transaction layer. In particular, on a receiver side, the transaction layer performs some checks on the TLPs to make sure the TLPs meet PCIe specifications. If the incoming packet does not check out properly, it can be designated a malformed packet and discarded. If the incoming packet checks out, the transaction layer updates its flow control tracking and continues to process the TLP.

The TLP processing engine provides operations that support sending and receiving PCIe TLPs to and from the FPGA. The TLP processing engine provides TLP operations as protection operations that prevent an untrusted or erroneous application from impacting the overall cloud computing system functionality and performance. The TLP operations support each of the following: an outbound path, an inbound path, executing validity checks, detecting malformed requests, filtering cycles, Function Level Reset (FLR), isolation and quality of service (QoS).

By way of example, the SPB (e.g., via a TLP processing engine) provides TLP operations specifically associated with outbound paths and inbound paths. For an outbound path to a PCIe endpoint vendor IP, the header fields required to form a TLP are transmitted from each downstream application over a corresponding dedicated SPB client interface. The SPB performs validity checks on header fields. The SPB generates TLPs that are transmitted over a PCIe physical link. A malformed request from a downstream application is detected, squashed, and logged within the SPB. On an inbound path to an SPB client, TLP operations that are protection operations are implemented on the inbound path to avoid fatal events. Fatal events can include denial of service or completion timeout on host-initiated cycle targeting a specific application. The TLP processing engine provides operations to filter cycles on a per-function, per-client, per-cycle type basis. In this way, the TLP processing engine ensures endpoint compliance and keeps the system operational when a downstream application (i.e., SPB client) enters an error state or is being serviced (e.g., reconfiguration or reset).

The SPB is further responsible for performing shared-link-interface service Function Level Reset (FLR) operations (referred to herein as FLR operations). A Function Level Reset can be defined in a PCIe specification. The FLR operations—using the SPB—allow an independent function to be reset while allowing other functions to be operational.

The SPB operates based on an SPB FLR protocol that is compliant with the PCIe specification. The SPB FLR protocol also allows FPGA acceleration applications to perform different types of operations, for example FPGA acceleration application operations can include remote access over a network or application-specific routines. FPGA application operations can be longer in duration than a permissible FPGA vendor-defined endpoint requirement.

The SPB is additionally responsible for performing shared-link-interface service isolation and QoS operations. Operationally, independent clients are isolated while sharing a common pool of available resources. The available resources can include credits and buffer space. For example, a credit flow controller—that provides a credit-aware data path interface—can keep track of an available buffer space on the other side of the shared PCIe physical link. When a PCIe endpoint vendor IP starts up, it indicates how much buffer space is available for each transaction cycle type. The sending device keeps track of how much space is left on the receiving side. The resources are advertised for a given physical PCIe link by an FPGA vendor endpoint IP. A given SPB client is prevented from erroneously or maliciously impacting the functional correctness and forward progress of other SPB clients or the overall system. Advantageously, the SPB and the shared-link-interface service can be provided in tandem to offer virtualization capabilities which allows multiple PCIe functions—physical or virtual, as defined in the PCIe specification—to be mapped to network, compute, storage or accelerator applications and efficiently share the FPGA fabric for cloud computing deployments.

Figure 1B:
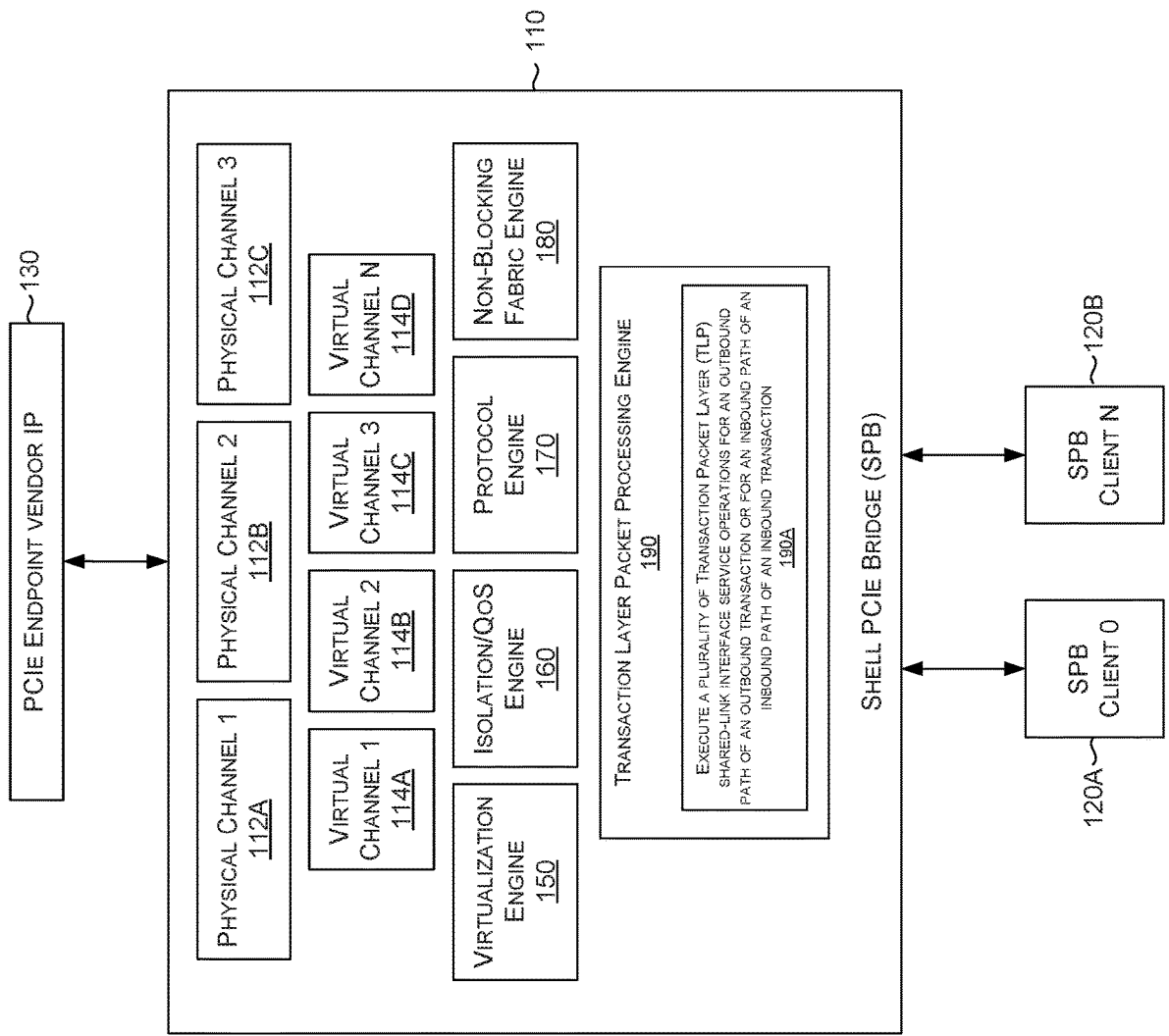
FIG. 1B is a block diagram of an exemplary PCIe system environment for providing PCIe operations based on shared-link-interface services in a PCIe system, suitable for use in implementing aspects of the technology described herein.
Figure 2:
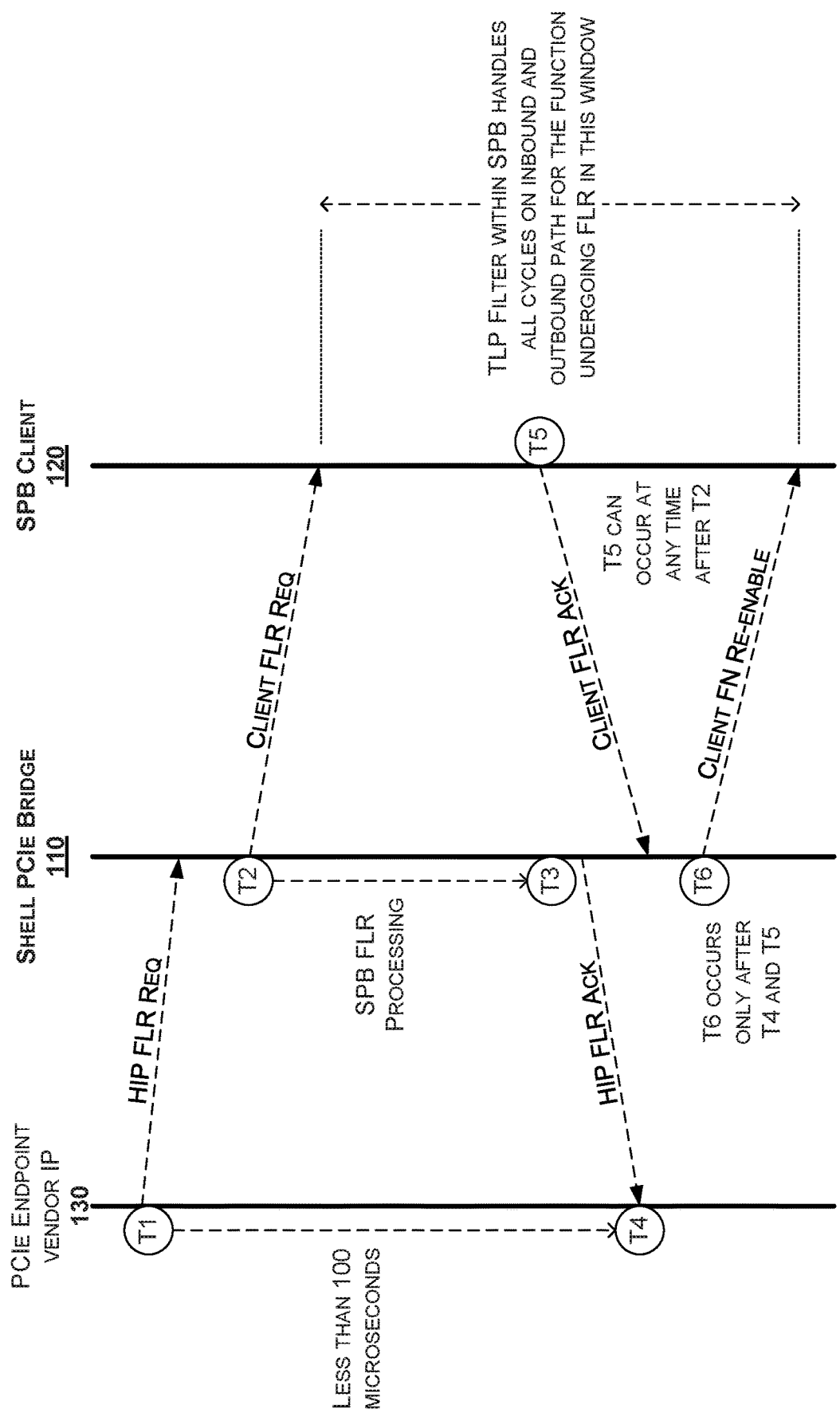
FIG. 2 is an exemplary PCIe system environment for providing PCIe operations based on shared-link-interface services in a PCIe system, in accordance with aspects of the technology described herein.

Overview of Exemplary Environments for Providing PCIe Operations Based on Shared-Link-Interface Services in a PCIe System Aspects of the technical solution can be described by way of examples and with reference to FIG. 1A, FIG. 1B, and FIG. 2. FIG. 1A is a block diagram of an exemplary technical solution environment, based on example environments described with reference to FIGS. 6 and 7 for use in implementing embodiments of the technical solution. Generally, the technical solution environment includes a technical solution system suitable for providing the example PCIe system 100 in which methods of the present disclosure may be employed. In particular, FIG. 1A shows a high level architecture of the PCIe system 100 in accordance with implementations of the present disclosure. Among other engines, managers, generators, selectors, or components not shown (collectively referred to herein as "components"), the technical solution environment of PCIe system 100 supports providing the technical solution described herein.

FIG. 1A illustrates a PCIe system 100 having Shell PCIe Bridge (SPB) 110, Shell PCIe Bridge Clients (SPB Clients) 120 (e.g., Shell PCIe Bridge Client 0, PCIe endpoint vendor IP130, and host CPU 140) and an SPB shared link interface. The SPB 110 supports a shared PCIe physical link based on the shared-link-interface comprising a vendor-agnostic downstream custom interface 110A and a vendor-specific upstream PCIe endpoint interface 110B. The SPB and shared-link-interface services support processing transactions (e.g., outbound transactions or the inbound transactions) for sharing a PCIe physical link. The PCIe system provides and performs improved PCIe system operations including shared-link-interface operations and interfaces to support the functionality of technical solution in a technical solution environment having components described herein with reference to FIG. 6 and FIG. 7.

At step 10A, an SPB client 0 from SPB clients 120 communicates an outbound transaction intended for a PCIe endpoint vendor IP. At step 10B, a PCIe endpoint vendor IP communicates an inbound transaction intended for the SPB client 0. At step 20, the SPB 110 accesses the outbound transaction intended for the PCIe endpoint vendor IP or an inbound transaction intended for the SPB client 0. At step 30, the SPB 110 processes the outbound transaction or the inbound transaction based on one or more SPB shared-link-interface services. At step 40, the SPB 110 communicates the outbound transaction to the PCIe endpoint vendor IP or the inbound transaction to the SPB client 0. At step 50A, the SPB client 0 accesses the inbound transaction intended for the SPB client 0. At step 50B, the PCIe endpoint vendor IP 130 accesses an outbound transaction intended for the PCIe endpoint vendor IP.

FIG. 1B illustrates the SPB 110, SPB Client 120A and SPB Client 120B and PCIe endpoint vendor IP 130. FIG. 1B also illustrates physical channel 1 112A and physical channel 2 112B, virtual channel 1, virtual channel 2, virtual channel 3, and virtual channel N, and virtual engine 150, isolation/QoS engine 160, protocol engine 170, and non-block fabric engine 180 that facilitate implementing corresponding shared-link-interface operations. SPB 110 includes Transaction Layer Packet Processing Engine 190. The SPB executes shared-link-interface operations to implement the shared-link-interface services (e.g., a non-blocking fabric, trusted Transaction Layer Packet (TLP), SPB Function Level Reset (FLR) protocol, isolation, and quality of service functionality) in the PCIe system. 1

At block 190, the Transaction Layer Packet Processing Engine 190 ("TLP processing engine" 190) is configured to execute a plurality of TLP shared-link-interface service operations for an outbound path of an outbound transaction or an inbound path of an inbound transaction. Amongst other shared-link-interface operations, TLP processing engine 190 supports accessing a plurality of dedicated SPB client interfaces associated with downstream applications. The SPB client interface are access for executing validation checks on header fields of TLPs to identify malformed requests. For example, because PCIe defines the transaction rules, any transaction or TLP violating these rules may be considered a malformed TLP. Specific rules that could be violated include data payload exceeding a max payload size or an actual data length does not match data length specified in the header.

Upon performing the validation checks, the SPB 110 generates PCIe-compliant TLPs that are communicated over the shared PCIe physical link. The SPB 110 is further configured to support detecting one or more fatal events comprising denial of service events or completion timeout events on host-initiated cycles targeting a specific SPB client. Fatal events may refer to uncorrectable errors that impact the PCIe fabric and would cause the PCIe physical link to become unreliable. The SPB 110 also supports filtering transaction cycles on a per-function, per-client, or per-cycle type basis. Transaction filtering can be a technique used to control and monitor outgoing and incoming packets and allow them to pass or halt based on the source and destination IP addressed Turning to FIG. 2, a flow diagram is provided illustrating PCIe operations for a Function Level Reset based on PCIe system 100 with components described with reference to FIG. 1A and FIG. 1B above. The Function Level Reset is performed as a shared-link-interface service in the PCIe system 100. In particular, the Function Level Reset is facilitated by a shared PCIe physical link based on a shared-link-interface comprising a vendor-agnostic downstream custom interface 110A and a vendor-specific upstream PCIe endpoint interface. A Function Level Reset can be defined in a PCIe specification. The FLR allows an independent function to be reset while allowing other functions to be operational. The SPB FLR protocol is compliant with PCIe requirements. The SPB FLR protocol also allows FPGA acceleration applications to perform operations.

As shown in FIG. 2, FPGA application operations can be longer in duration than a permissible FPGA vendor-defined endpoint requirement. At step T1, the PCIe endpoint vendor IP 130 communicates a request to the SPB 110. At step T2, the SPB 110 communicates the request to SPB client 120, and at step T3 the SPB 110 communicates an acknowledgement of the request to the PCIe endpoint vendor IP 130. T1 and T4 is a duration within a predefined time period of a vendor endpoint. This predefined time period is compliant with the PCIe specification requirements. However, the SPB 110 circumvents or bypasses this requirement—in practice—because at step T5, the SPB client 120 communicates an acknowledgement to the SPB 110. T5 can occur any time after T2. At T6, the SPB 110 communicates instructions to enable an SPB function. The instructions at T6 are communicated only after T4 and T5. In this way, the SPB FLR protocol can support different types of operations, for example FPGA acceleration application operations can include remote access over a network or application-specific routines. It is contemplated that the FLR operates based on technical solution environment having SPB 110 that supports a shared PCIe physical link based on a shared-link-interface with a vendor-agnostic downstream custom interface 110A and a vendor-specific upstream PCIe endpoint interface 110B.

Functionality of the embodiments of the present invention have further been described, by way of an implementation and anecdotal examples, to demonstrate that the operations for providing PCIe operations, based on shared-link-interface services, are an unconventional ordered combination of operations. The unconventional combination of operations operate with an SPB as a solution to a specific problem in PCIe systems technology environments to improve computing operations in PCIe systems. Advantageously, the embodiments described herein improve the computing operations, functionality, and the technological process for providing the functionality described herein. Overall, these improvements result in less CPU computation, smaller memory requirements, and increased flexibility in PCIe systems.

Figure 3:
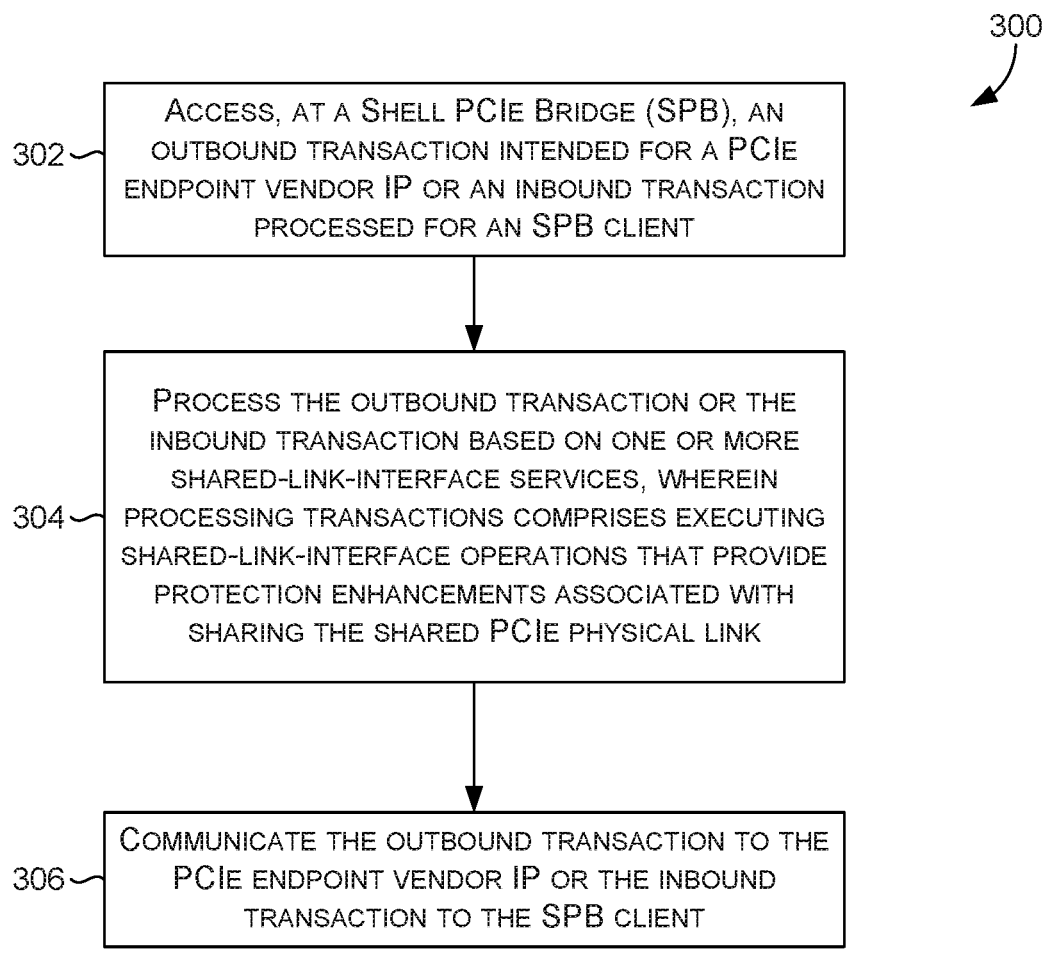
FIG. 3 provides a first exemplary method of providing PCIe operations based on shared-link-interface services in a PCIe system in accordance with aspects of the technology described herein.
Figure 4:
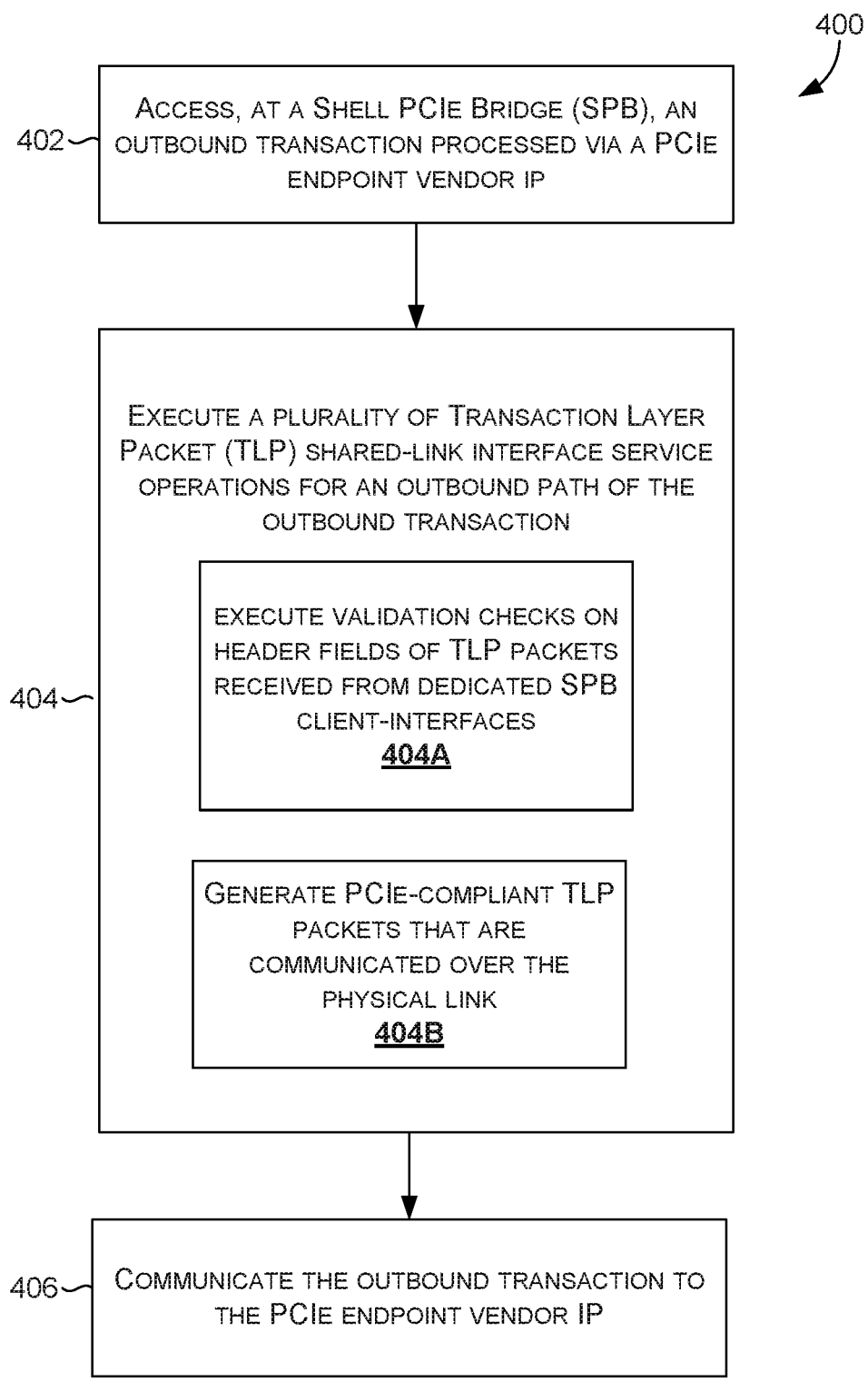
FIG. 4 provides a second exemplary method of providing PCIe operations based on shared-link-interface services in a PCIe system, in accordance with aspects of the technology described herein.
Figure 5:
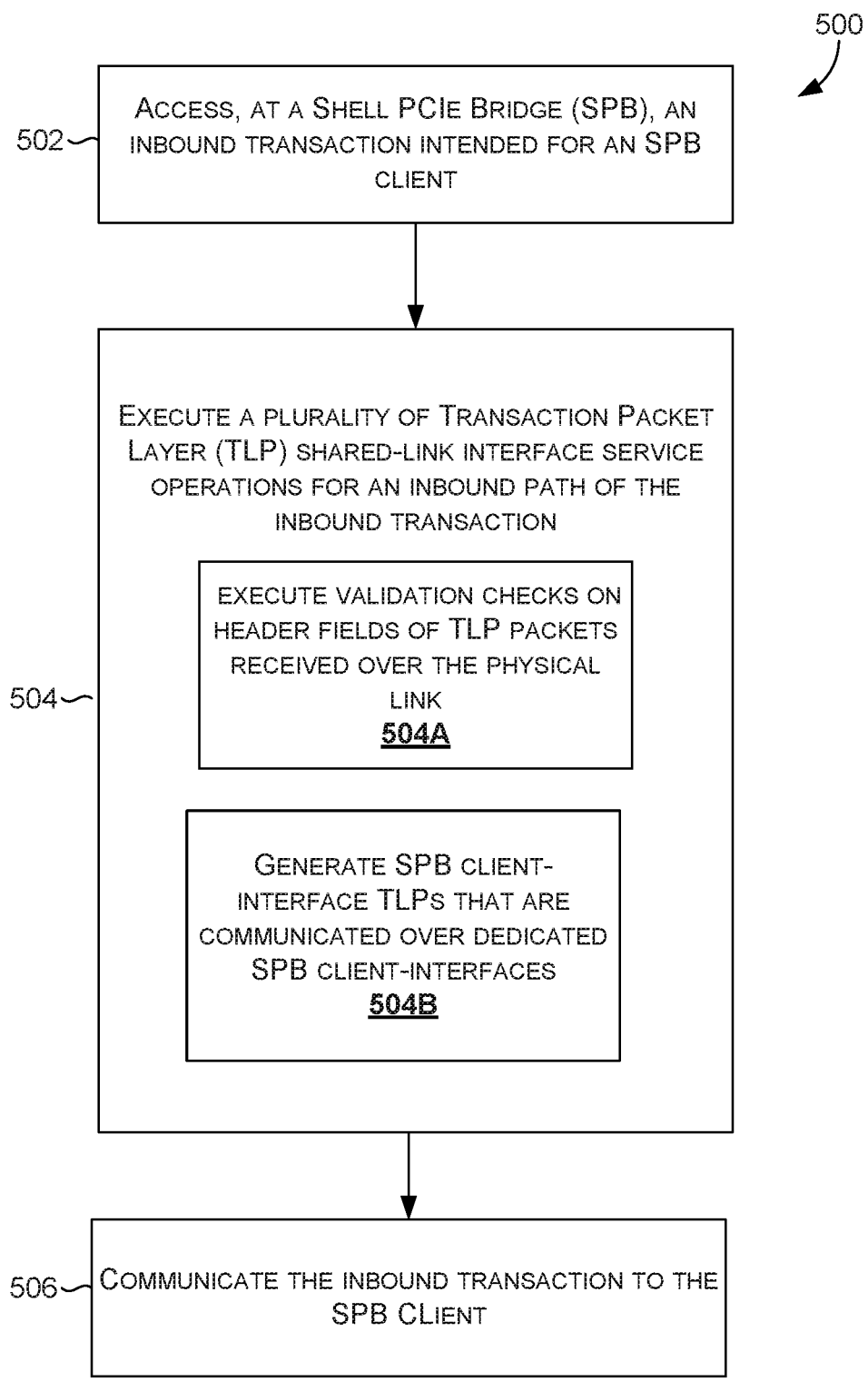
FIG. 5 provides a third exemplary method of providing PCIe operations based on shared-link-interface services in a PCIe system, in accordance with aspects of the technology described herein.

Exemplary Methods for Providing PCIe Operations Based on Shared-Link-Interface Services in a PCIe System With reference to FIGS. 3, 4 and 5, flow diagrams are provided illustrating methods for PCIe operations based on shared-link-interface services in a PCIe system. The methods may be performed using the search system described herein. In embodiments, one or more computer storage media having computer-executable instructions embodied thereon that, when executed, by one or more processors can cause the one or more processors to perform the methods in the file system.

Turning to FIG. 3, a flow diagram is provided that illustrates a method 300 for providing PCIe operations based on shared-link-interface services in a PCIe system. At block 302, a Shell PCIe Bridge (SPB) accesses an outbound transaction intended for a PCIe endpoint vendor IP or an inbound transaction intended for an SPB client. The SPB supports a shared PCIe physical link based on a shared-link-interface comprising a vendor-agnostic customer interface and a vendor-specific upstream PCIe endpoint interface. The SPB includes physical channels and virtual channels configured for routing at least two transaction cycle types for a plurality of accelerators on chips. The SPB further supports the vendor-specific PCIe endpoint for maintaining PCIe specification compliance while operating the vendor-agnostic downstream custom interface for sharing the shared PCIe physical link.

At block 304, the SPB processes the outbound transaction or the inbound transaction based on one or more shared-link-interface services. Processing a transaction comprises executing shared-link-interface operations that provide protection enhancements associated with sharing the shared PCIe physical link. The SPB supports routing at least two transaction cycle types to enable non-blocking data flows for an outbound path and an inbound path—a first transaction cycle type is a memory write transaction cycle, a second transaction cycle type is a memory read transaction cycle type, and a third transaction cycle type is a completion transaction cycle type. Each transaction cycle type operates based on an independent virtual channel for the outbound path. Each transaction cycle type is mapped to a physical PCIe channel that is virtualized to support at least two virtual channels for the inbound path.

At step 306, the SPB communicates the outbound transaction to the PCIe endpoint vendor IP or the inbound transaction to the SPB client.

Turning to FIG. 4, a flow diagram is provided that illustrates a method 400 for providing PCIe operations based on shared-link-interface services in a PCIe system. At block 402, a Shell PCIe Bridge (SPB) accesses an outbound transaction intended for a PCIe endpoint vendor IP. At block 404, the SPB executes a plurality of Transaction Layer Packet shared-link-interface service operations for an outbound path of the outbound transaction. At block 404A, the SPB executes validation checks on header fields of TLPs received from dedicated SPB client-interfaces. The SPB includes a Transaction Layer Packet (TLP) processing engine for executing the validation checks on header fields on TLPs.

The TLP processing engine further support additional TLP shared-link-interface operations comprising one or more of the following: accessing a plurality of dedicated SPB client interfaces associated with downstream applications; detecting one or more fatal events comprising denial of service events or completion timeout events on host-initiated cycles targeting a specific SPB client; and filtering transaction cycles on a per-function, per-client, or per-cycle type basis.

At block 404B, the SPB generates PCIe-compliant TLPs that are communicated over the physical link. At block 406, the SPB communicates the outbound transaction to the PCIe endpoint vendor IP. The SPB further supports isolating SPB clients while sharing a common pool of available resources and a credit-aware data path interface. Available resources are advertised for the shared PCIe physical link, and isolating a first SPB client from a second SPB client prevents the first SPB client from interfering with transactions of the second SPB client associated with the shared PCIe physical link.

Turning to FIG. 5, a flow diagram is provided that illustrates a method 500 for providing PCIe operations based on shared-link-interface services in a PCIe system. At block 502, a Shell PCIe Bridge (SPB) accesses an inbound transaction intended for an SPB client. At block 504, the SPB executes a plurality of Transaction Layer Packet shared-link-interface service operations for an inbound path of the inbound transaction. At block 504A, the SPB executes validation checks on header fields of TLPs received over the physical link. The SPB includes a Transaction Layer Packet (TLP) processing engine for executing the validation checks on header fields on TLPs. The TLP processing engine further supports performing TLP shared-link-interface operations comprising using an SPB Function Level Reset (FLR) protocol to allow a first independent function to be reset while allowing a second independent function to be operational. The SPB FLR protocol is compliant with a PCIe specification while allowing independent function reset operations to be performed longer than a predefined time period of the PCIe endpoint vendor IP.

At block 504B, the SPB generates SPB client-interface TLPs that are communicated over dedicated SPB client-interfaces. At block 506, the SPB communicate the inbound transaction to the SPB client.

Example Distributed Computing System Environment

Figure 6:
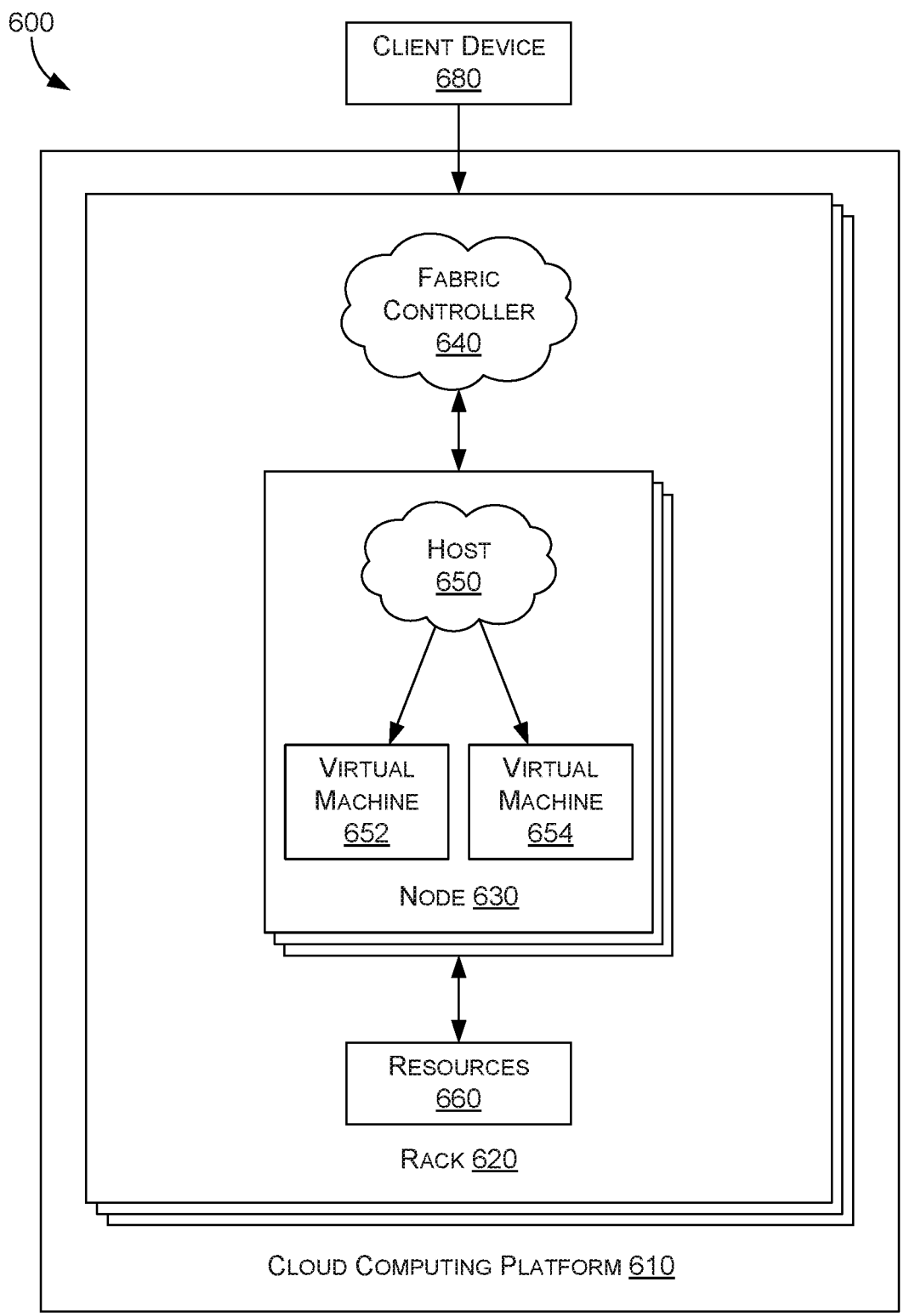
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Figure 7:
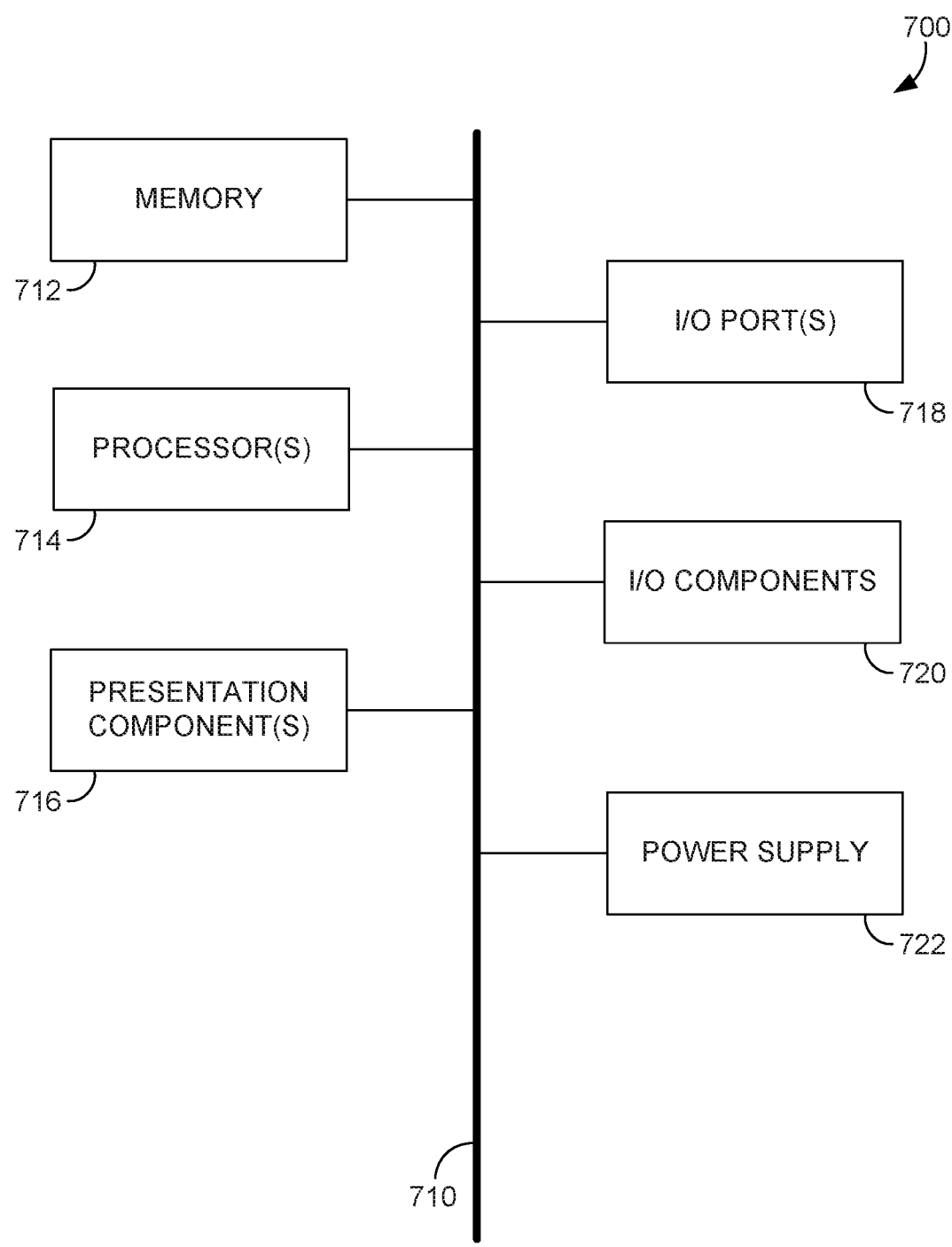
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing, at a Shell PCIe Bridge (SPB), an outbound transaction intended for a PCIe endpoint vendor IP or an inbound transaction intended for a first SPB client, wherein the SPB supports a shared PCIe physical link based on a shared-link-interface comprising a vendor-agnostic downstream custom interface and a vendor-specific upstream PCIe endpoint interface;
processing the outbound transaction or the inbound transaction based on one or more shared-link-interface services, wherein processing transactions comprises executing shared-link-interface operations that provide protection enhancements associated with isolating the first SPB client from a second SPB client that shares a common pool available resource while sharing the shared PCIe physical link, wherein isolating the first SPB client from the second SPB client prevents the first SPB client from interfering with transactions of the second SPB client associated with the shared PCIe physical link; and
communicating the outbound transaction to the PCIe endpoint vendor IP or the inbound transaction to the SPB client.

2. The system of claim 1, wherein the SPB comprises physical channels and virtual channels configured for routing at least two transaction cycle types for a plurality of accelerators on-chip; and
wherein the SPB supports vendor-specific PCIe endpoints for maintaining PCIe specification compliance while operating the vendor-agnostic downstream custom interface for sharing the shared PCIe physical link.

3. The system of claim 1, wherein the SPB supports routing at least two transaction cycle types to enable non-blocking data flow for an outbound path;
wherein a first transaction cycle type is a memory write transaction cycle, a second transaction cycle type is a memory read transaction cycle type, and a third transaction cycle type is a completion transaction cycle type; and
wherein each transaction cycle type operates based on an independent virtual channel for the outbound path.

4. The system of claim 1, wherein the SPB supports routing at least two transaction cycle types to enable non-blocking data flow for an inbound path;
wherein a first transaction cycle type is a memory write transaction cycle type, a second transaction cycle type is a memory read transaction cycle type, and a third transaction cycle type is a completion transaction cycle type; and
wherein each transaction cycle type is mapped to a physical PCIe channel that is virtualized to support at least two virtual channels for the inbound path.

5. The system of claim 1, wherein the SPB further comprises a Transaction Layer Packet (TLP) processing engine for performing TLP shared-link-interface operations comprising one or more of the following:
accessing a plurality of dedicated SPB client interfaces associated with downstream applications;
executing validation checks on header fields of TLPs to identify malformed requests;
generating PCIe-compliant TLPs that are communicated over the shared PCIe physical link;
detecting one or more fatal events comprising denial of service events or completion timeout events on host-initiated cycles targeting a specific SPB client; and
filtering transaction cycles on a per-function, per-client, or per-cycle type basis.

6. The system of claim 1, further comprising using an SPB Function Level Reset (FLR) protocol to allow a first independent function to be reset while allowing a second independent function to be operational, wherein the SPB FLR protocol is compliant with a PCIe specification while allowing independent function reset operations to be performed longer than a predefined time period of the PCIe endpoint vendor IP.

7. The system of claim 1, wherein the SPB further supports isolating SPB clients while sharing a common pool of available resources and a credit-aware data path interface.

8. One or more computer-storage media having computer-executable instructions embodied thereon that, when executed by a computing system having a processor and memory, cause the processor to:
access, at a Shell PCIe Bridge (SPB), an outbound transaction intended for a PCIe endpoint vendor IP or an inbound transaction intended for an SPB client, wherein the SPB supports a shared PCIe physical link based on a shared-link-interface comprising a vendor-agnostic downstream custom interface and a vendor-specific upstream PCIe endpoint interface;
process the outbound transaction or the inbound transaction based on one or more shared-link-interface services, wherein processing transactions comprises executing shared-link-interface operations that provide protection enhancements associated with isolating the first SPB client from a second SPB client that shares a common pool available resource while sharing the shared PCIe physical link wherein isolating the first SPB client from the second SPB client prevents the first SPB client from interfering with transactions of the second SPB client associated with the shared PCIe physical link; and
communicate the outbound transaction to the PCIe endpoint vendor IP or the inbound transaction to the SPB client.

9. The media of claim 8, wherein the SPB comprises physical channels and virtual channels configured for routing at least two transaction cycle types for a plurality of accelerators on-chip; and
wherein the SPB supports vendor-specific PCIe endpoints for maintaining PCIe specification compliance while operating the vendor-agnostic downstream custom interface for sharing the shared PCIe physical link.

10. The media of claim 8, wherein the SPB supports routing at least two transaction cycle types to enable non-blocking data flow for an outbound path;

wherein a first transaction cycle type is a memory write transaction cycle, a second transaction cycle type is a memory read transaction cycle type, and a third transaction cycle type is a completion transaction cycle type; and wherein each transaction cycle type operates based on an independent virtual channel for the outbound path.

11. The media of claim 8, wherein the SPB supports routing at least two transaction cycle types to enable non-blocking data flow for an inbound path;

wherein a first transaction cycle type is a memory write transaction cycle type, a second transaction cycle type is a memory read transaction cycle type, and a third transaction cycle type is a completion transaction cycle type; and wherein each transaction cycle type is mapped to a physical PCIe channel that is virtualized to support at least two virtual channels for the inbound path.

12. The media of claim 8, wherein the SPB further comprises a Transaction Layer Packet (TLP) processing engine for performing TLP shared-link-interface operations comprising one or more of the following:

accessing a plurality of dedicated SPB client interfaces associated with downstream applications;

executing validation checks on header fields of TLPs to identify malformed requests;

generating PCIe-compliant TLPs that are communicated over the shared PCIe physical link;

detecting one or more fatal events comprising denial of service events or completion timeout events on host-initiated cycles targeting a specific SPB application; and filtering transaction cycles on a per-function, per-client, or per-cycle type basis.

13. The media of claim 8, further comprising using an SPB Function Level Reset (FLR) protocol to allow a first independent function to be reset while allowing a second independent function to be operational, wherein the SPB FLR protocol is compliant with a PCIe specification while allowing independent function reset operations to be performed longer than a predefined time period of the PCIe endpoint vendor IP.

14. The media of claim 8, wherein the SPB further supports isolating SPB clients while sharing a common pool of available resources and a credit-aware data path interface, wherein the available resources are advertised for the shared PCIe physical link.

15. A computer-implemented method, the method comprising:

accessing, at a Shell PCIe Bridge (SPB), an outbound transaction intended for a PCIe endpoint vendor IP or an inbound transaction intended for an SPB client, wherein the SPB supports a shared PCIe physical link based on a shared-link-interface comprising a vendor-agnostic downstream custom interface and a vendor-specific upstream PCIe endpoint interface;

processing the outbound transaction or the inbound transaction based on one or more shared-link-interface services, wherein processing transactions comprises executing shared-link-interface operations that provide protection enhancements associated with isolating the first SPB client from a second SPB client that shares a common pool available resource while sharing the shared PCIe physical link wherein isolating the first SPB client from the second SPB client prevents the first SPB client from interfering with transactions of the second SPB client associated with the shared PCIe physical link; and communicating the outbound transaction to the PCIe endpoint vendor IP or the inbound transaction to the SPB client.

16. The method of claim 15, wherein the SPB comprises physical channels and virtual channels configured for routing at least two transaction cycle types for a plurality of accelerators on-chip; and wherein the SPB supports vendor-specific PCIe endpoints for maintaining PCIe specification compliance while operating the vendor-agnostic downstream custom interface for sharing the shared PCIe physical link.

17. The method of claim 16, wherein the SPB supports routing at least two transaction cycle types to enable non-blocking data flow for an outbound path and an inbound path;

wherein a first transaction cycle type is a memory write transaction cycle, a second transaction cycle type is a memory read transaction cycle type, and a third transaction cycle type is a completion transaction cycle type;

wherein each transaction cycle type operates based on an independent virtual channel for the outbound path; and wherein each transaction cycle type is mapped to a physical PCIe channel that is virtualized to support at least two virtual channels for the inbound path.

18. The method of claim 15, wherein the SPB further comprises a Transaction Layer Packet (TLP) processing engine for performing TLP shared-link-interface operations comprising one or more of the following:

accessing a plurality of dedicated SPB client interfaces associated with downstream applications;

executing validation checks on header fields of TLPs to identify malformed requests;

generating PCIe-compliant TLPs that are communicated over the shared PCIe physical link;

detecting one or more fatal events comprising denial of service events or completion timeout events on host-initiated cycles targeting a specific SPB application; and filtering transaction cycles on a per-function, per-client, or per-cycle type basis.

19. The method of claim 15, further comprising using an SPB Function Level Reset (FLR) protocol to allow a first independent function to be reset while allowing a second independent function to be operational, wherein the SPB FLR protocol is compliant with a PCIe specification while allowing independent function reset operations to be performed longer than a predefined time period of a vendor PCIe endpoint.

20. The method of claim 15, wherein the SPB further supports isolating SPB clients while sharing a common pool of available resources and a credit-aware data path interface, wherein the available resources are advertised for the shared PCIe physical link.

* * * * *